Figure 1:
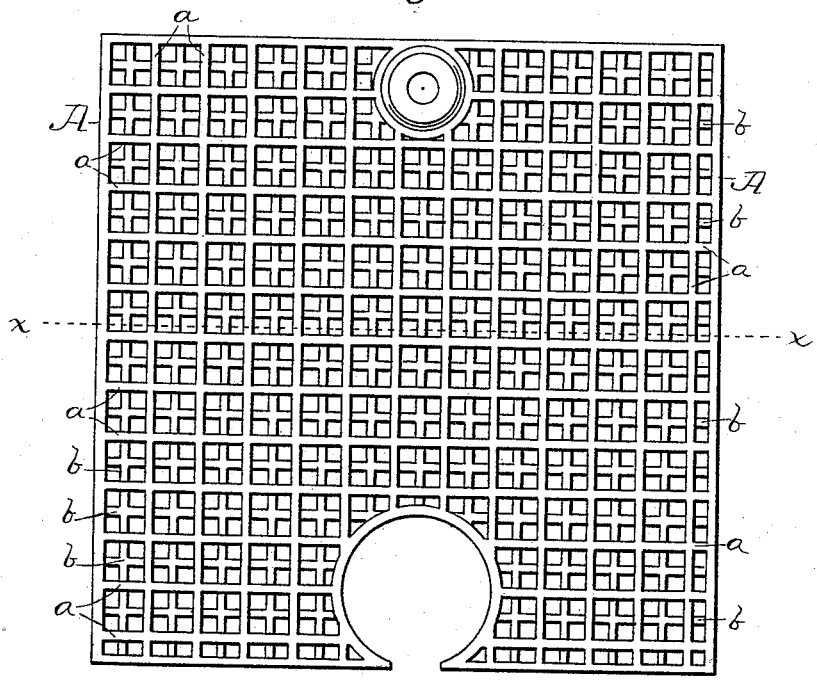

(No Model.)

H. G. OSBURN.
ELECTRODE FOR SECONDARY BATTERIES.

No. 418,140. Patented Dec. 24, 1889.

Harry Gould Osburn
Inventor

Witnesses
Eugene H. Still
F. H. Goin

By his Attorney
Frank D. Thomason

UNITED STATES PATENT OFFICE.

HARRY GOULD OSBURN, OF CHICAGO, ILLINOIS.

ELECTRODE FOR SECONDARY BATTERIES.

SPECIFICATION forming part of Letters Patent No. 418,140, dated December 24, 1889.

Application filed August 23, 1889. Serial No. 321,722. (No model.)

*To all whom it may concern:*

Be it known that I, HARRY GOULD OSBURN, of Chicago, Cook county, Illinois, have invented a certain new and useful Improvement in Grids or Plates for Electric Batteries, of which the following is a full, clear, and exact description, reference being had to the accompanying drawings, and to the letters of reference marked thereon.

One of the greatest difficulties heretofore experienced in the construction and use of electrical storage-batteries is the retention of the active material in the supporting conductor-plates of the positive and negative electrodes, respectively. This active material or peroxide of lead is, in a plastic state, pressed against the said plates or into the perforations thereof, and after having been dried is placed in the solution, which, when the charging and discharging takes place, or when the batteries are subjected to any considerable jolting or jarring, (as when used for illuminating or motor purposes on vehicles of any kind,) is washed out or falls off or out of the perforations of the plate, thus very materially affecting the efficiency of the batteries.

The object of my invention is to provide a plate or grid so constructed that after the plastic active material is forced into the perforations of said plate or grid and the latter completed and dried the material is held securely therein, substantially as hereinafter fully described, and as illustrated in the drawings, in which—

Figure 2:

Figure 1 is a plan view of one of my improved plates, and Fig. 2 is a transverse section therethrough, taken on line *x x*, Fig. 1.

In the drawings, A represents a plate or grid of any suitable surface dimensions, preferably of a rectangular shape, having on one side the longitudinal and transverse ribs *a a*, and having on the opposite side the transverse and longitudinal ribs *b b*. The transverse ribs are placed the same distance apart as the longitudinal ribs. Thus they bound square openings in the plate A; but the ribs *a a* on one side of the said plate are so arranged with reference to the ribs *b* on the opposite side thereof that the point of intersection of the transverse ribs with the longitudinal ribs on one side comes opposite the center of the square openings bounded by the ribs on the opposite side of the plate. As plate A is made integral, this arrangement makes practically four small square openings instead of one large square, which, if there were only the ribs *a* or the ribs *b*, would otherwise be. This construction, when the active material has been pressed into the plate, makes, as shown in the drawings, one connected mass of active material C, the active material in each square inclosure bounded by ribs *a* being connected through the smaller square opening with the four squares bounded by ribs *b* on the opposite side of the plate, whose intersection comes opposite the center of each square inclosed by ribs *a*, and vice versa.

In order to provide additional precautions against the active material becoming dislodged from the plate, I make in the outer surfaces or crest of the longitudinal ribs *a* or *b*, or in the transverse ribs, or both, as desired, longitudinal V-shaped gutters *d*, as shown in Fig. 2, which thus make what might be described as "marginal fins" for each square inclosure. When the plastic active material has been pressed into the plate or grid A, the plate is submitted to such treatment, either by hand or machinery, that the fins formed by guttering the ribs are upset over the walls of the square inclosures, as shown by the right-hand half of the plate shown in Fig. 2 of the drawings.

I do not wish to be considered as confining myself to the use of the marginal fins in the construction of my plate. They may be used or not, as desired.

What I claim as new is—

1. In an electric secondary battery, a metal conductor-plate having gutters made in the bars bounding the sides of the perforations therein, which are upset so as to form fins, which lap over the edges of the said perforations and confine the active material previously placed therein, as set forth.

2. A metal conductor-plate for an electrical battery having longitudinal and transverse ribs or bars, the outer surfaces of which are provided with longitudinal gutters, which form marginal fins for the openings bounded by said ribs, which are upset to lap over the edges of said opening to confine the active material therein, as set forth.

3. A metal conductor-plate for electric batteries having independent transverse and longitudinal bars or ribs on each side, the intersection of the transverse and longitudinal bars on one side of the plate coming opposite the centers of the inclosures bounded by the transverse and longitudinal ribs on the opposite side of the same, said bars being provided with longitudinal grooves in their outer surfaces, which form marginal fins, which, when the said plate is filled with active material, as described, are upset and lap over the edges of said inclosures, so as to confine the active material therein, as set forth.

HARRY GOULD OSBURN.

Witnesses:
FRANK D. THOMASON,
EUGENE H. HILL.